Figure 1:
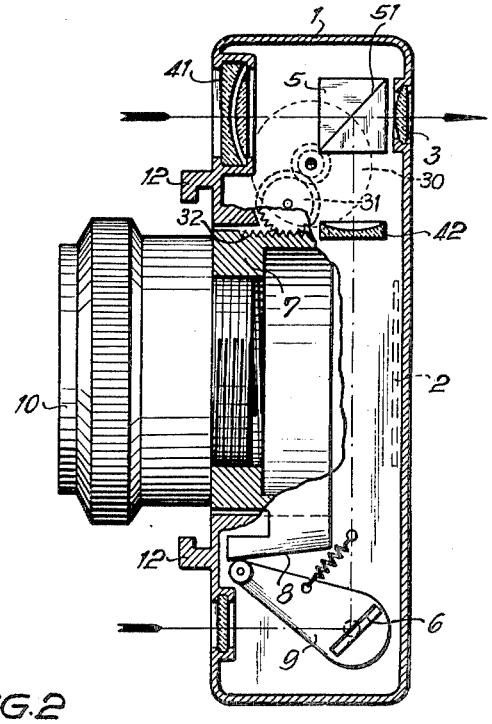

Sept. 29, 1959  H. NAUMANN ET AL  2,906,185
EXCHANGEABLE OBJECTIVES FOR PHOTOGRAPHIC CAMERAS
Filed Nov. 30, 1954  4 Sheets-Sheet 1

INVENTORS
Helmut Naumann &
Albrecht Wilhelm Tronnier
BY Mock-Blum
ATTORNEYS

Sept. 29, 1959  H. NAUMANN ET AL  2,906,185
EXCHANGEABLE OBJECTIVES FOR PHOTOGRAPHIC CAMERAS
Filed Nov. 30, 1954  4 Sheets-Sheet 2

INVENTORS
Helmut Naumann,
Albrecht Wilhelm Tronnier
BY Mock - Blum
ATTORNEYS

INVENTORS
Helmut Naumann &
Albrecht Wilhelm Tronnier
BY Moer, Blum
ATTORNEYS

INVENTORS
Helmut Naumann &
Albrecht Wilhelm Tronnier
BY Mock - Blum
ATTORNEYS

United States Patent Office 2,906,185
Patented Sept. 29, 1959

2,906,185

EXCHANGEABLE OBJECTIVES FOR PHOTOGRAPHIC CAMERAS

Helmut Naumann, Munich, and Albrecht Wilhelm Tronnier, Gottingen, Germany, assignors to Voigtlander Aktiengesellschaft, Braunschweig, Germany, a corporation of Germany Application November 30, 1954, Serial No. 472,152

Claims priority, application Germany December 7, 1953

17 Claims. (Cl. 95—44)

The present invention relates to exchangeable objectives for photographic cameras provided with a range finder which is capable of being coupled with the exchangeable objective in such manner that, during focusing, adjustment of one of the coupled elements, e.g. adjustment of the range finder, by means of a rotatable button or the like provided in the camera, automatically results in a correspondingly dimensioned adjustment of the other element, i.e. in the case of the present example, of the objective.

The invention has particular relation to exchangeable objectives of cameras, in which the device for focusing the objective is firmly built in in the camera and is connected with the range finder in such manner that the indication of the range finder is fixedly tuned with the focusing of the objective having a predetermined focal length, which is denoted hereinafter "normal focal length" of the camera.

If objectives having other focal lengths are attached to such cameras, they must be displaced for focusing to finite distances by amounts other than those applied to the "normal objective." The ratio of the corresponding displacements is in rough approximation equal to the ratio of the squares of the focal lengths of the objectives.

Objectives of the above-mentioned type can be displaceably arranged in a mount which is firmly connected with the camera. The adjusting displacement derived from the camera for the normal objective, can be enlarged or reduced by means of lever systems, or other devices, in such manner that the corresponding displacement suitable for adjusting other exchangeable objectives, is brought about.

It is relatively easy to bring about a reduced displacement which corresponds to an exchangeable objective of shorter focal length. However, certain mechanical difficulties are encountered if a larger displacement, necessary for objectives of longer focal length, has to be brought about. Therefore in the last mentioned case of objectives of long focal length, an objective type was preferred, which can be adjusted by displacement of its front lens.

The main object of the present invention consists in providing in cameras of the above mentioned type—i.e. for cameras having a range finder which is adapted to be coupled with exchangeable objectives in such a manner that adjustment of the range finder by means of a rotatable button or the like, automatically results in correct focusing, exchangeable objectives which are designed in such a manner that they are correctly focused automatically by the focusing means provided in the camera for the "normal objective," without change of said focusing means.

This is attained according to this invention by having in the exchangeable objective one displaceable lens element, preferably the front lens element, and selecting the equivalent focal length of the exchangeable objective and the focal length of its displaceable lens element in accordance with the requirements of the present invention, as described hereinafter.

The exchangeable objective used according to the present invention is fastened to the camera by conventional means, such as a bayonet catch the use of which is customary in exchangeable photographic objectives. In order to effect focusing to objects in finite distances, the movement of the adjusting member of the camera is transmitted to the solely displaceable front component of the objective attached to the camera, for example, by means of a rigid pressure member or pull member which is connected with said solely displaceable front component of the exchangeable objective and is preferably adapted to be automatically coupled with the respective adjusting member of the camera upon attachment of the objective. The optical elements of the objective, which follow said front component in the direction of light toward the image plane, remain stationary during focusing of the objective.

Objectives embodying the present invention are of a simple mechanical structure; they can be therefore economically manufactured and are substantially trouble-free. The invention can be applied to objectives having a focal length which is shorter than that of the normal objective and can be also applied to objectives of long focal length, particularly to tele-objectives.

The exchangeable objectives used according to the present invention are designed in such manner that the focal length ($f_{V_W}$) of the displaceable lens components is equal to the equivalent focal length ($f_N$) of the "normal objective" so that the identity condition $$f_{V_W} \equiv f_N \qquad (1)$$

is met. If instead of the focal lengths the refractive forces are considered, condition 1 takes the form $$\varphi_{V_W} \equiv \varphi_N \qquad (2)$$

In the above-mentioned case, in which focusing is effected by displacing the converging front lens ($L_1$) of the exchangeable objective, the condition $$\varphi_{1W} = \varphi_N$$

applied, wherein, for example, in the case of the frequently used miniature cameras of 23 x 36 mm.² with $f_N=52$ mm. focal length, $\varphi_N$ has the numerical refractive power value of $+19.2$ dptr.

In proceeding from the "normal objective" to the exchangeable objective, it should be first stated that the quotient of the equivalent focal length ($f_W$)—which refers in conventional manner to the objective focused at infinity—of the exchangeable objective, and the focal length of its displaceable component ($f_{V_W}$), should be denoted $Q_W$ or in other words $$f_W \div f_{V_W} = Q_W \qquad (3)$$

According to the invention the exchangeable objective has to be designed in such manner that in accordance with the above conditions 1 and 3 its equivalent focal length meets the condition $$f_W = Q_W \cdot f_N \qquad (4)$$

*Example*

If the exchangeable objective used consists of a lens system of the four-lens triplet-type and the specific type disclosed in U.S. Patent No. 2,573,511 is used, the value of $Q_W$ is $$Q_W = 1.98$$

According to the above condition 4, an exchangeable objective of this type has to be designed in such manner that its equivalent focal length, for example for a normal focal length of the camera of $f_N=52$ mm., amounts to $$f_W = 52 \cdot 1.98 = 103 \text{ mm.}$$

In this manner the exchangeable objective of this specific type will have a refractive power of the displaceable lens component $L_1$ corresponding to $\varphi_{1W}=19.2$ dpt., so that the focal length amounts to $f_{V_W}=52$ mm. and the condition of expression 1 is met.

The appended drawings illustrate further embodiments and details of the invention, to which the invention is not limited.

Figure 2:
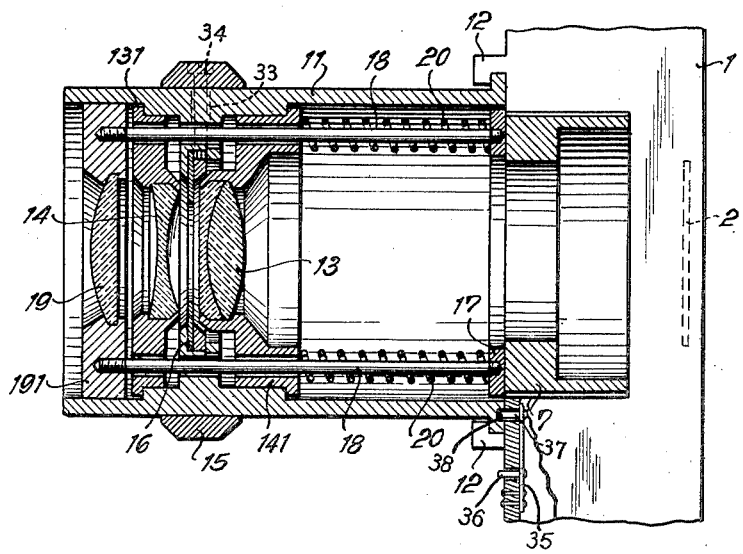
Figure 3:
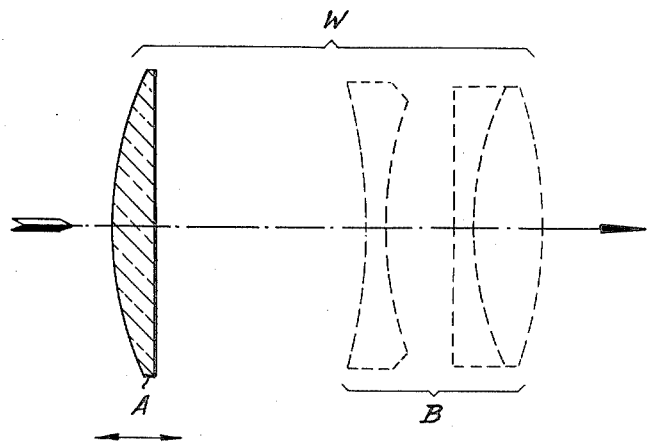
Figure 4:
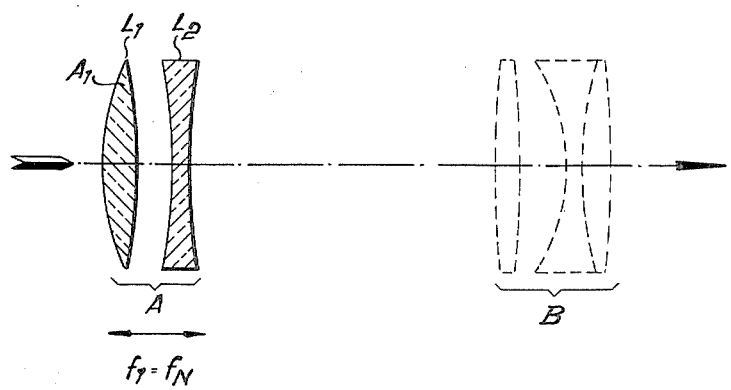
Figure 5:
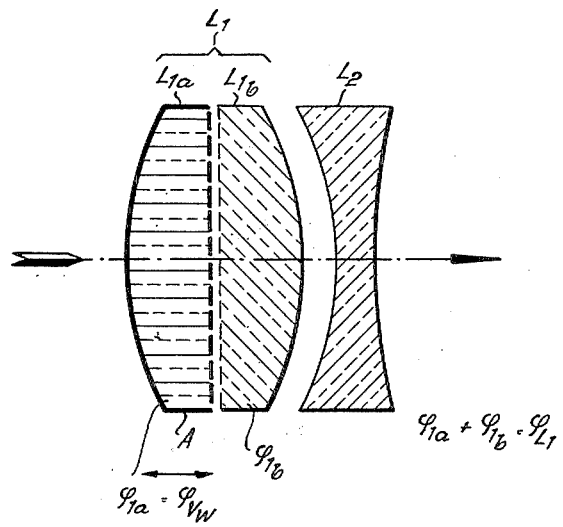
Figure 6:
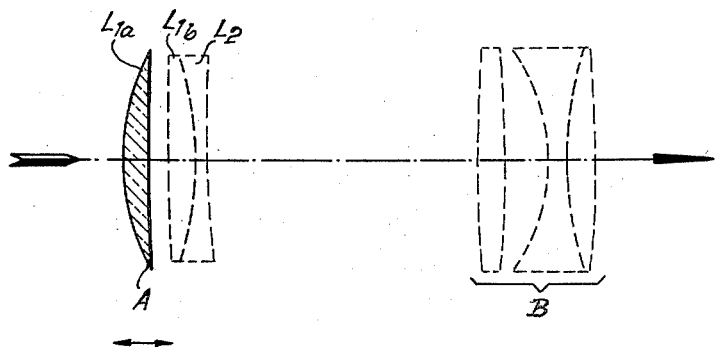
Figure 7:
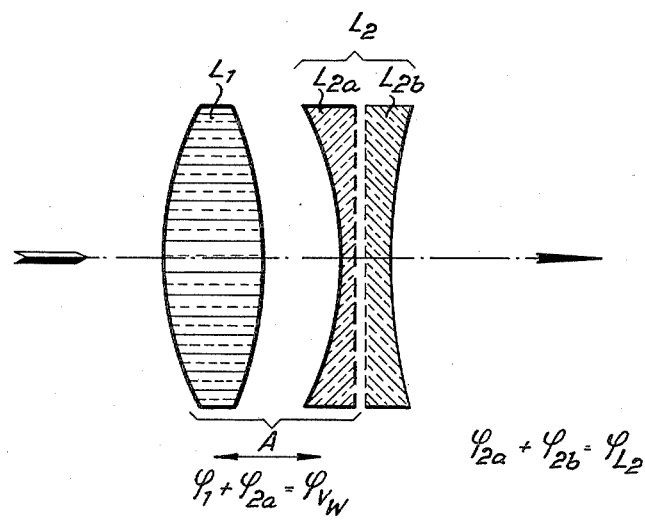
Figure 8:
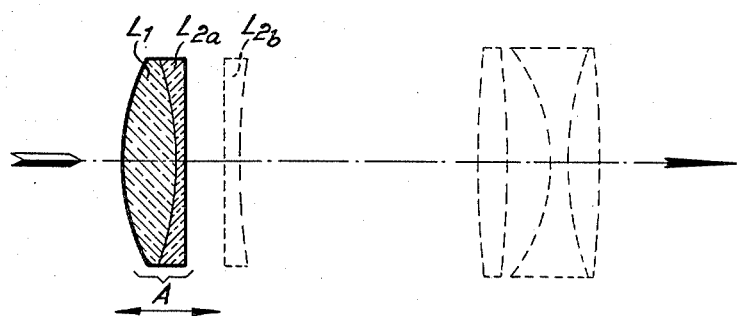

In Figures 1 to 6 of the drawings such details are illustrated diagrammatically. Figures 1 and 2 are illustratrations of camera parts and of an objective, embodying the invention. Figure 3 illustrates the lens system of the exchangeable objective, shown in Figure 2, on an enlarged scale. Figure 4 illustrates a lens system forming a tele-objective and Figure 5 shows, on an enlarged scale, a specific modification of such objective. Figure 6 illustrates a further modification of the objective shown in Figure 4 and Figures 7 and 8 illustrate the use of a split and cemented lens, respectively.

The lenses shown in the drawings are not drawn exactly to scale, because this is not necessary for illustrating the invention. It will be understood that in carrying out the invention, objectives of other structure can also be used and structural details of the camera, other than those illustrated in the drawings, can likewise be used.

In the drawings equal and similar parts are denoted by similar reference symbols. Parts or elements which are not necessary for full disclosure of the invention have been omitted in the drawings.

Referring now to the drawings in detail, in Figure 1 the camera body 1 comprises the film plane 2, a range finder provided with ocular lens 3, image lens 41, split cube 5 having a permeable mirror or reflecting surface 51, intermediate lens 42, and swinging mirror 6. The drawtube 7 is operated for example by manual actuation of a rotatable button 30 over a pinion 31 cooperating with the latter and a toothed member 32 arranged in draw tube 7, or by manually turning the tube proper in accordance with the distance to be adjusted. Thereby, the tube controls, in a manner known by itself, swinging mirror 6. This is done, for example, over cam 8 and lever 9, whereby these parts are dimensioned in such manner that swinging movement of mirrors 6 of the range finder and the adjusting movement of the objective for focusing the image for a focal length of, for example, $f_N=52$ mm. of the normal objective 10 screwed on in tube 7, correspond to each other. This means that, upon changing from the adjustment to "infinite" to the focused adjustment to a distance of, for example, 1 m., measured from the plane of the diaphragm, tube 7 will be advanced by a displacement path $V_N=2.8$ mm. from the camera.

Figure 2 illustrates the same camera, in which, however, the normal objective 10 has been substituted by an objective of long focal length. Mount 11 of this exchangeable objective is rigidly fastened upon its attachment, by means of bayonet hook 12 to camera casing 1, i.e. not to tube 7. This objective contains lens elements 13, 14, which are seated in casing elements 131, 141, always remain in the same position and do not belong to the front member of the objective, as well as diaphragm 16.

Thereby, adjustment of the diaphragm is effected by a ring 15 which is arranged on the outer side of mount or frame 11 and is connected with the diaphragm over a screw 34 which extends through slot 33. A ring 17 lies against tube 7 of the camera and transmits adjusting movement of the tube, for example over rods 18, shown by way of example, to the displaceable front component 19 of the objective, which is seated in sliding member 191, whereby stationary members 13, 14 of the objective are not caused to move. The objective comprising elements 13, 14, 19 is designed in such manner that, at the desired relatively long total focal length, front lens 19, which is the only displaceable element, has a focal length $f_{V_W}$ which is equal to the equivalent focal length $f_N$ of normal objective 10, i.e. complies with the above condition 1 ... $f_{V_W}=f_N$.

In order to suppress lost motion between tube 7 and front component 19, springs 20 are used. The arrangement and construction of arresting means for preventing inadvertent removal of objective body 11 from hooks 12 depends on the structure of the camera parts in each individual case and can be carried out in various ways in embodiments of the present invention. In the example shown in the drawing, a simple spring bar or bolt 35 is used which is fastened to the wall of the camera casing in such manner that it permanently tends to lean against this interior wall. Leaf spring 35 carries an actuating pin 36 and a detent pin 37. Both pins permeate with play the wall of the camera casing through bores and their length is selected in such manner that they slightly project from the camera casing. Thereby, actuating pin 36 is freely accessible for operation by finger pressure, while said pin 37 engages a bore 38 provided in the front surface of mount 11, said bore 38 being in a position opposite the said pin in proper coupling position of objective body 11. In this manner the mount is secured from being inadvertently turned. In order to exchange the mount, pin 37 can be removed from bore 38 by pressing pin 36, so that the mount can be turned to unlocking position and can be removed.

The embodiment illustrated in Figure 2, is an unsymmetrical, partly cemented four-lens system, the front lens of which consists of an individual lens. This system is attached to a miniature camera, in which the focal length of the "normal objective" is, for example, $f_N=52$ mm., at an image size of 24 x 36 mm$^2$.

The lenses of the objective illustrated in Figure 2 are shown, on an enlarged scale, in Figure 3. Corresponding to the above equations of conditions and to the beforementioned example, the objective has a quotient $Q_W=1.98$ and an equivalent focal length of $f_W=103$ mm. As explained above, the focal length of the displaceable front component A, of $F_{V_W}=52$ mm. is equal to the "normal objective focal length" of, for example, $f_N=52$ mm. Thus, displacement of front component A of the exchangeable objective W, will be equal to the corresponding displacement paths of the total "normal objective" and, for focusing to finite distances of objects, only the displaceable lens component A will be moved, while the other lens members B of exchangeable objective W remain stationary in their mount.

Instead of the objective system illustrated in Figure 3, objective systems of other design and effect, e.g. tele-objectives can be used in carrying out the present invention and the front component of such other objectives can consist of several lens elements, some of which can be cemented, if desired. Furthermore, to the camera wide angle objectives can be attached; the front members follow the principles of the present invention and can consist of individual lenses, or composite lenses.

The use of a tele-objective in carrying out the invention, is illustrated in Figure 4, in which, however, only the lens elements are shown. Figure 4 illustrates, on an enlarged scale, a tele-objective having an equivalent focal length of $f=100$ mm. as a unit (U). In this objective system, the converging front lens ($L_1$) has a focal length of $f_1=26$ mm. or 26% of this unit (U) and the total front part ($L_1$, $L_2$) has a focal length of $f_{1,2}=69.8$ mm. or 69.8% of this unit (U).

According to the above Equation 3, this means that in the case of this lens ($L_1$) the quotient is $Q_1=3.85$ and for the total front part ($L_1$, $L_2$) the quotient is $Q_{1,2}=1.43$.

For using it in carrying out the present invention, the tele-objective in which the front member ($L_1$) is the only displaceable part, has to be desgned in accordance with the above condition 4 in such manner that its equivalent focal length amounts, for example, to $$f_W=3.85 \cdot 52=200 \text{ mm.}$$

Thereby, the focal length of said adjustable front element $L_1$ amounts to $$f_1 = f_{V_W} = f_N = 52 \text{ mm.}$$

If, however, in the exchangeable objective of the invention, the entire front part ($L_1$, $L_2$) is rendered displaceable, the total objective has to be designed in such manner that according to the above equations conformably to the quotient $Q_{1,2}$ the equivalent focal length amounts to $$f_W = 1.43 \cdot 52 = 74 \text{ mm.}$$

In this case, the above condition 1 is also met and $$f_{1,2} = f_{V_W} = f_N = 52 \text{ mm.}$$

In the above examples the equivalent focal length of the exchangeable objectives was selected in accordance with the above condition 4 and the displaceable member of the exchangeable objective has a focal length equal to that of the "normal objective."

However, the invention contemplates also another way which must be followed if for a predetermined, or required, equivalent focal length $f_W$ of the exchangeable objective, the respective objective type shows a different distribution between the focal lengths $f_W$ and $f_{V_W}$, in comparison with the above described examples. From the above conditions 1 and 3 the following condition can also be derived:

$$f_W \div f_N = Q_W^* \quad (5)$$

Applying this to the present example:

$$f_W \div 52 = Q_W^*$$

Figure 5 illustrates on an enlarged scale, the front member of the tele-objective shown in Fig. 4 and the means for obtaining the $$Q_W^*$$

value necessary in this specific embodiment of the invention. As shown in this enlarged illustration, by dividing lens ($L_1$) into partial lenses ($L_{1a}$ and $L_{1b}$) in a simple manner it can be attained to have the displaceable lens element A designed, for example, as lens $L_{1a}$ in such manner that the focal length amounts to $$f_{1a} = f_{V_W} = f_N$$

and the respective refractive power is $$\varphi_{1a} = \varphi_{V_W} = N$$

This refractive power corresponds to the equivalent refractive power of the "normal objective" of the example and thus amounts to $+19.2$ dptr. and the equivalent focal length corresponds to the "normal objective" of the example, i.e. it amounts to 52 mm. Thus, here again the displacement path of this displaceable lens component of the exchangeable objective will be equal to that of the "normal objective."

Splitting of lens $L_1$ can be carried out in conventional manner without difficulty, because it can be always secured that the two individual elements $L_{1a}$ and $L_{1b}$ have the same refractive power as the original lens $L_1$, i.e.

$$\varphi_{1a} + \varphi_b = \varphi_{L_1}$$

This procedure can be applied according to the invention in all practically occurring cases at predetermined total focal length of the exchangeable objectives and the quotient $$Q_W^*$$

required in the respective case realized by designing the objectives in this manner.

In the use of the tele-objective illustrated in Fig. 4, the equivalent focal length amounted to 200 mm. in the example, as the displaceable front component of this objective has the quotient $Q_W = 3.85$. However, if it is desired that the exchangeable objective of this structure should have, for example, the often desired focal length of 5 inches = 127 mm., according to the above condition 5 in this case the required value of the quotient according to the invention will be $$Q_W^* = 127.0 \div 52 = 2.44$$

In this example, the 5″ objective to be used has a total refractive power of $\varphi_W = 7.87$ dptr. As explained in connection with Fig. 4, this tele-objective of specific design has a focal length of the front lens ($L_1$) of $f_1 = 26$ mm. at an equivalent focal length of $f = 100$ mm.

The focal length $f_1 = 26$ mm. corresponds to a refractive power of $\varphi_1 = 38.5$ dptr., which is equal to a total refractive power of 10.0 dptr. Thus, it is actually $\varphi_1 = 3.85 \varphi_W$ for this type, as already has been explained in connection with Fig. 4. In conformity with Fig. 5, lens $L_1$ has to be split now according to the invention in such manner that it is composed of two individual lenses $L_{1a}$ and $L_{1b}$, of which the displaceable lens has a focal length which meets the condition $$f_{1a} = f_W / Q_W = 52 \text{ mm.}$$

whereby the effective refractive power is $$\varphi_{V_W} = \varphi_W \cdot Q_W^* \quad (6)$$

and in view of $$\varphi_{1a} = \varphi_{V_W}$$

then amounts to $$\varphi_{1a} = 7.87 \cdot 2.44 = 19.2 \text{ dptr.}$$

The total refractive power $$\varphi_{L_1} = \varphi_{1a} + \varphi_{1b}$$

amounts to the product $$\varphi_{L_1} = 3.85 \cdot \varphi_W = 3.85 \cdot 7.87 = 30.3 \text{ dptr.}$$

Thereby, according to the invention the amount of refractive power left for lens $L_{1b}$ is $$\varphi_{1b} = 30.3 - 19.2 = 11.1 \text{ dptr.}$$

By following the principle of construction, the exchangeable objective having a focal length of $f_W = 127$ mm., is provided with a lens component ($L_{1a}$), which in view of its refractive power ($\varphi_{1a} = 19.2$ dptr.), has a focal length of $$f_{V_W} = f_N = 52 \text{ mm.}$$

Figure 6 illustrates, in equal size, an exchangeable objective according to Fig. 4, which is constructed in the before described manner, whereby the separating surfaces between lenses $L_{1a}$ and $L_{1b}$ are curved, in order to exactly comply with condition 1 in this specific case. Figure 6 also shows the manner, in which, in order to avoid a too great number of reflecting glass-air-surfaces in practical realization, lens elements $L_{1b}$ and $L_2$ are cemented to a structural unit. The distance of this unit from rear member B is unchangeable, because, as stated above, only displaceable element $L_{1a}$ is used for focusing.

This lens $L_{1a}$ proper can be designed as a displaceable cemented composite member for example in order to obtain spherical or chromatic corrections also within this displaceable element. Such modifications can be carried out in conventional manner without difficulty, according to the principles of the invention.

Instead of splitting the front lens member ($L_1$) in the above described manner, other lens components which are the displaceable elements in the novel exchangeable objectives of the invention can be likewise split, in conformity with conditions 1 and 2.

Figure 7 illustrates by way of example splitting of the lens which follows the front lens. Thereby in analogy to the illustration of Figure 5, the refractive power $\varphi_{L_2}$ is split into 2 partial refractive forces $\varphi_{2a}$ and $\varphi_{2b}$. Thus, the displaceable lens member A is composed of individual lenses $L_1$ and $L_{2a}$.

In conformity with the illustration in Figure 6, in Figure 8 the two individual elements $L_1$ and $L_{2a}$ of displaceable objective member A are combined to a structural unit by cementing.

The above described and formulated rule of the invention is based on the assumption that the corresponding principal points and focal points differ only slightly from each other. In cases of a considerable difference between the focal lengths of "normal objective" and exchangeable objective, this assumption often will not be correct to the extent of approximation, which is desirable or necessary for practical utilization. In such cases, the front focal point of the displaceable lens component will not be located in direct nearness to the location of the front focal point of the "normal objective" and there will be a difference ($a$) between the location of these principal points, which must be taken into consideration in order to obtain exact focusing. This is attained according to the invention by meeting—instead of conditions 1 and 4—the following novel conditions:

$$f^{**}_{V_W} \div f_N \quad (1a)$$

wherein $$f^{**}_{V_W} = f_{V_W} \cdot (1 + K_W)$$

$K_W$ stands for the respective correction value for consideration of the different locations of the focal points. In a similar manner, the condition $$f_W = Q_W \cdot f_N \quad (4a)$$

has to be used in designing exchangeable objectives embodying the invention. Thereby, the new quotient $$Q^{**}_W$$

is equal to the product of the above described quotient $Q_W$ and said correction member $(1+K_W)$, for taking into consideration the difference in location of the focal points, the latter being limited in its range by the numerical range of $$K_W \approx \pm 0.1$$

If the front focal points of normal objective, on the one hand, and of the adjustable component of the exchangeable objective, on the other hand, coincide in location, the value of $K_W$ will be zero. In this case, $$Q^{**}_W \text{ and } Q^{*}_W$$

will have the value of $Q_W$, in the above described manner.

The value of $K_W$ can be, for example, determined on the basis of the following consideration. If $a$ denotes the difference of location of the focal points due to the differing lengths of normal objective and exchangeable objective, according to Newton's image equation the condition $$xx' = f_N^2$$

applies, wherein $x$ is a finite distance of object, referred to the normal objective and $x'$ denotes the corresponding focusing movement of the camera indicated by the range finger. However, for the exchangeable objective the distance of object is $(x-a)$ and the following is found for the focal length of the displaceable member of the exchangeable objective:

$$x'(x-a) = f_{V_W}^2 = f_N^2 (1+K_W)^2$$

and from this it follows:

$$-x' \cdot a = f_N^2 (2K_W + K_W^2)$$

and $$-\frac{a}{x} = 2K_W + K_W^2$$

As $a$ is usually smaller by an order of magnitude than $x$, the following is true with practically sufficient exactness:

$$K_W = -\frac{a}{2x}$$

Furthermore, as the above mentioned correction value is strictly correct for a distance of object of $x=x_K$ only, said value must be selected in such manner that for other values $x \neq x_K$, the resulting adjustment of errors of the exchangeable objective relative to the normal objective and the range finder, do not exceed a certain amount, e.g. a fixed fraction of the range of depth of field measured according to conventional or specific conditions. In this case, it is appropriate to make the distance $x$ equal to 1.2 to 1.5 times of the smallest distance of the object, to which the exchangeable objective is supposed to be used for close-ups.

In the case of the example illustrated in Fig. 4, with consideration of these differing positions of the focal point locations, in focusing by means of converging front lens ($L_1$), the correction value will be $K_W = -0.55$. Correspondingly, in the case of this specific construction the value $(1+K_W)$ will be 0.945.

Further considering $$Q^{**}_W = Q_W \cdot (1+K_W)$$

in this case it will be $$Q^{**}_1 = 3.85 \cdot 0.945 = 3.64$$

Thus, the corrected focal length of the exchangeable objective in this example will be $$f^{**}_W = 3.64 \cdot 52 = 189 \text{ mm.}$$

and the equivalent focal length will be roundly $f_W = 19$ cm.

Thereby, the focal length $$f^{**}_{V_W}$$

of the front lens will be $$f^{**}_{V_W} = f_N \cdot (1+K_W) = 49.3 \text{ mm.}$$

instead of the normal focal length $f=52$ mm. which would apply in the case of $a=K=0$.

What is claimed is:

1. Exchangeable objective system including at least one exchangeable objective comprising more than one lens member, in combination with a photographic camera having a range-finder and with built-in means for range-finder coupled focusing; each of the exchangeable objectives having one lens member which is displaceable within the exchangeable objective and a residual objective part which is stationary within said exchangeable objective; said displaceable lens member having a focal length which is equal to the equivalent focal length of the "normal objective" of said camera; each of the exchangeable objectives meeting the condition $$f_W = Q_W \cdot f_N$$

wherein $f_W$ stands for the equivalent focal length of the exchangeable objective, $Q_W$ stands for the quotient from $f_W$ and the focal length of said displaceable lens member of the exchangeable objective and $f_N$ stands for the equivalent focal length of the "normal objective" of said camera; means for transmitting movement of said built-in focusing means of the camera to said displaceable lens member of the exchangeable objective in attached condition of the latter to the camera, in order to obtain correct focusing of the attached exchangeable objective, with the same adjusting displacement by the range-finder coupled focusing means as in the focusing of the normal objective in the camera.

2. Exchangeable objective system as claimed in claim 1, in which the equivalent focal length of an exchangeable objective considerably differs from the equivalent focal length of the "normal objective" and the displaceable lens member of the exchangeable objective has a focal length which, with the inclusion of a correction factor depending on the type and the desired nearest distance of the object, is adapted to compensate for the difference of position of the front focal points of the "normal objective" and the exchangeable objective, respectively.

3. Exchangeable objective system as claimed in claim 1, in which the equivalent focal length of an exchangeable objective considerably differs from the equivalent focal length of the "normal objective" and the displaceable lens member of the exchangeable objective has a focal length which, with the inclusion of a correction factor depending on the type and the desired nearest distance of the object, is adapted to compensate for the difference of position of the front focal points of the "normal objective" and the exchangeable objective, respectively, said correction factor denoted $K_W$ having the value $$K_W = -\frac{a}{2x}$$

wherein $a$ denotes the difference between the position of the front focal point of the "normal objective" and that of the front component of the exchangeable objective and $x$ stands for the distance of the object referred to as the "normal objective."

4. Exchangeable objective system as claimed in claim 1, in which the equivalent focal length of an exchangeable objective considerably differs from the equivalent focal length of the "normal objective" and the displaceable lens member of the exchangeable objective has a focal length which, with the inclusion of a correction factor depending on the type, and the desired nearest distance of the object, is adapted to compensate for the difference of position of the front focal points of the "normal objective" and exchangeable objective, respectively, said correction factor denoted $K_W$ having the value $$K_W = -\frac{a}{2x}$$

wherein $a$ denotes the difference between the position of the front focal point of the "normal objective" and that of the front component of the exchangeable objective and $x$ stands for the object distance at which full correction for the influence of the difference of postion of the front focal points is obtained, said distance corresponding to 1.2 to 1.5 times the nearest distance at which the exchangeable objective can be used.

5. Exchangeable objective system as claimed in claim 1, in which the exchangeable objective is of the triplet type and the displaceable lens member is the converging front lens of said objective.

6. Exchangeable objective system as claimed in claim 1, in which the exchangeable objective is a tele-objective and the displaceable lens member is an individual front lens component of said teleobjective.

7. Exchangeable objective system as claimed in claim 1, in which the exchangeable objective is a tele-objective and the displaceable lens member is a cemented front lens component of said tele-objective.

8. Exchangeable objective system as claimed in claim 1, in which the exchangeable objective is a wide-angle objective and the displaceable lens member is an individual front lens of said wide-angle objective.

9. Exchangeable objective system as claimed in claim 1, in which the exchangeable objective is a wide-angle objective and the displaceable lens member is a composite front lens of said wide-angle objective.

10. Exchangeable objective system as claimed in claim 1, in which the front lens member of the exchangeable objective is subdivided into a first lens on the front side and a subsequent second lens and said first lens, the refractive power of which is equal to the refractive power of the "normal objective," serves as the displaceable lens element, in order to equalize the focal length of the displaceable lens component of the exchangeable objective with the focal length of the "normal objective."

11. Exchangeable objective system as claimed in claim 1, in which in the exchangeable objective separation of the displaceable component is effected in a lens member which follows the first lens element of said objective, and the displaceable component includes all lens elements which are located in front of this line of separation in the direction of light.

12. Exchangeable objective system as claimed in claim 1, in which in the exchangeable objective separation of the displaceable component is effected in a lens member which follows the first lens element of said objective, and the displaceable component includes all lens elements which are located in front of this line of separation in the direction of light, and said lens elements are cemented together to form a structural unit.

13. Exchangeable objective system, as claimed in claim 1, in which the front lens member of the exchangeable objective is separated into two lens elements, the first of which serves as the displaceable lens member and the subsequent lens element is united with a following lens element to form a structural unit.

14. Exchangeable objective system as claimed in claim 1, in which the front lens member of the exchangeable objective is subdivided into a first lens on the front side and a subsequent second lens and said first lens, the refractive power of which is equal to the refractive power of the "normal objective," serves as the displaceable lens element, in order to equalize the focal length of the displaceable lens component of the exchangeable objective with the focal length of the "normal objective"; said subdivision being carried out along a plane.

15. Exchangeable objective system as claimed in claim 1, in which the front lens member of the exchangeable objective is subdivided into a first lens on the front side and a subsequent second lens and said first lens, the refractive power of which is equal to the refractive power of the "normal objective," serves as the displaceable lens element, in order to equalize the focal length of the displaceable lens component of the exchangeable objective with the focal length of the "normal objective," said subdivision being carried out along a curved surface.

16. Exchangeable objective system as claimed in claim 1, in which an exchangeable objective has means for attaching it to the camera, the exchangeable objective being carried by a mount adapted to be fastened to the camera by means of a bayonet catch, said built-in means including a displaceable focusing tube attached to the camera, the stationary lens elements of the exchangeable objective being non-displaceably held by said mount, while the displaceable lens element of the exchangeable objective is seated in a sliding member which is coupled, by means of said transmission means, with the displaceable focusing tube of the camera, upon attaching the exchangeable objective to the camera.

17. An exchangeable objective system as claimed in claim 16, in which said transmission means comprise rods which are fastened to said sliding member of the objective and to a ring attached to the objective applied to the camera tube and freely pass through the casing parts holding the non-displaceable elements of the exchangeable objective; a coil spring being provided for urging said ring toward the camera tube.

References Cited in the file of this patent

UNITED STATES PATENTS

| | | |
|---|---|---|
| 1,973,213 | Kuppenbender et al. | Sept. 11, 1934 |
| 2,235,364 | Gramatzki | Mar. 18, 1941 |
| 2,660,527 | Naumann | Nov. 24, 1953 |

FOREIGN PATENTS

| | | |
|---|---|---|
| 676,075 | Great Britain | July 23, 1952 |

OTHER REFERENCES

Bolas et al: text, "The Lens," published by Dawborn and Wand, Ltd., London, 1902, page 112.

Piper: text, "A First Book of the Lens," published by Hazell, Watson and Viney, Ltd., London, 1901, pages 52 and 53.

Jenkins et al.: text, "Fundementals of Optics," published by McGraw-Hill Book Co., 1950, page 159.